United States Patent
Daniels et al.

(10) Patent No.: US 8,985,942 B2
(45) Date of Patent: Mar. 24, 2015

(54) TURBINE EXHAUST CASE DUCT

(75) Inventors: William A. Daniels, Marlborough, CT (US); John J. Korzendorfer, Glastonbury, CT (US); David A. Debyah, Newington, CT (US); Scott A. Ladd, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 477 days.

(21) Appl. No.: 13/539,610

(22) Filed: Jul. 2, 2012

(65) Prior Publication Data

US 2014/0003922 A1    Jan. 2, 2014

(51) Int. Cl.
F01D 25/24 (2006.01)

(52) U.S. Cl.
CPC .................................. F01D 25/24 (2013.01)
USPC ....................................... 415/144; 415/182.1

(58) Field of Classification Search
CPC ......... F01D 25/24; F01D 25/32; F04D 29/44; F04D 29/444
USPC ......... 415/144, 145, 201, 182.1, 208.1–211.2
See application file for complete search history.

(56) References Cited

U.S. PATENT DOCUMENTS

| | | | |
|---|---|---|---|
| 4,920,742 A | 5/1990 | Nash et al. | |
| 5,362,204 A | 11/1994 | Matyscak et al. | |
| 5,634,767 A | 6/1997 | Dawson | |
| 7,055,305 B2 | 6/2006 | Baxter et al. | |
| 7,100,358 B2 | 9/2006 | Gekht et al. | |
| 7,712,315 B2 | 5/2010 | Hautman et al. | |
| 7,798,765 B2 | 9/2010 | Snyder et al. | |
| 7,857,594 B2 | 12/2010 | Kidikian et al. | |
| 7,950,236 B2 | 5/2011 | Durocher et al. | |
| 8,083,465 B2 | 12/2011 | Herbst et al. | |
| 2004/0255573 A1 | 12/2004 | Rago | |
| 2008/0041033 A1 | 2/2008 | Durocher et al. | |
| 2008/0307795 A1 | 12/2008 | Bader et al. | |
| 2010/0275614 A1 | 11/2010 | Fontaine et al. | |

OTHER PUBLICATIONS

The International Search Report mailed Aug. 23, 2013 for International application No. PCT/US2013/038751.

*Primary Examiner* — Edward Look
*Assistant Examiner* — Maxime Adjagbe
(74) *Attorney, Agent, or Firm* — Kinney & Lange, P.A.

(57) ABSTRACT

An exhaust duct comprises a shroud body, a forward flange assembly, an aft flange assembly, an intermediate flange assembly, and a first plurality of bleed ports. The forward flange assembly extends radially inward from a forward shroud end for securing the forward shroud end downstream of a final turbine stage. The aft flange assembly extends circumferentially around and radially inward from an aft shroud end for securing the aft shroud end to an engine tail cone. The intermediate flange assembly is disposed forward of the aft flange assembly, and extends circumferentially around and radially inward from the shroud body for securing the shroud body to an engine bearing housing. The first plurality of bleed ports is disposed around the shroud body forward of a junction with the intermediate flange.

20 Claims, 5 Drawing Sheets

TURBINE EXHAUST CASE DUCT

STATEMENT OF GOVERNMENT INTEREST

This invention was made with government support under Contract No. F33657-88-C-0134 awarded by United States Air Force. The government has certain rights in the invention.

BACKGROUND

The described subject matter relates generally to turbine exhaust cases for gas turbine engines, and more specifically to exhaust ducts for turbine exhaust cases.

The aft exhaust region of a gas turbine engine, like many other areas in the engine power core, often experiences high thermal gradients across relatively small distances. High thermal gradients, particularly in relatively thin metal components can lead to fatigue cracking or other defects before the desired end of a product life cycle, leading to premature replacement or in-mission engine malfunction. Cracking can be exacerbated by engine vibration and rapid thermal cycling. Certain high performance turbine engines designed for rapidly changing thermal and operational conditions are thus particularly prone to these and similar defects.

SUMMARY

An exhaust duct comprises a shroud body, a forward flange assembly, an aft flange assembly, an intermediate flange assembly, and a first plurality of bleed ports. The forward flange assembly extends radially inward from a forward shroud end for securing the forward shroud end downstream of a final turbine stage. The aft flange assembly extends circumferentially around and radially inward from an aft shroud end for securing the aft shroud end to an engine tail cone. The intermediate flange assembly is disposed forward of the aft flange assembly, and extends circumferentially around and radially inward from the shroud body for securing the shroud body to an engine bearing housing. The first plurality of bleed ports is disposed around the shroud body forward of a junction with the intermediate flange.

A turbine exhaust case (TEC) duct assembly comprises a forward TEC duct, an aft TEC duct, and an engine tail cone. The aft TEC duct includes an aft TEC duct shroud body with an inwardly extending forward flange assembly securing a forward shroud end to the forward TEC duct. An inwardly extending aft flange assembly secures an aft shroud end to the engine tail cone. An inwardly extending intermediate flange assembly is provided for securing the aft TEC duct to an engine bearing housing. The shroud body includes a first plurality of bleed ports disposed forward of a junction of the shroud body and intermediate flange assembly.

DETAILED DESCRIPTION

Figure 1:
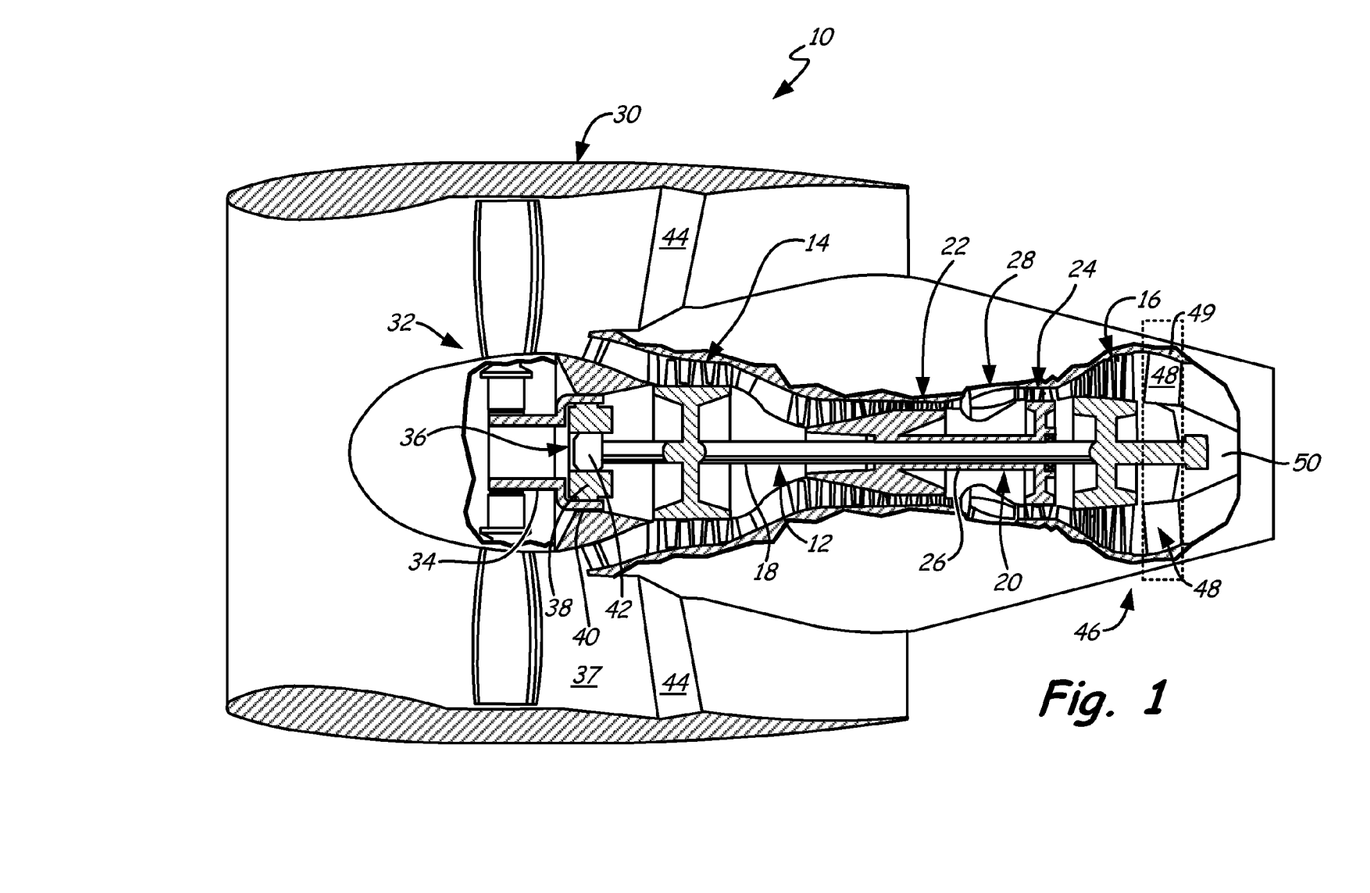
FIG. 1 is a schematic cross-section of a gas turbine engine.

FIG. 1 includes gas turbine engine 10, low spool 12, low pressure compressor (LPC) 14, low pressure turbine (LPT) 16, low pressure shaft 18, high spool 20, high pressure compressor (HPC) 22, high pressure turbine (HPT) 24, high pressure shaft 26, combustor 28, nacelle 30, propulsion fan 32, fan shaft 34, fan drive gear system 36, planetary gear 38, ring gear 40, sun gear 42, fan exit guide vanes 44, turbine exhaust case (TEC) 46, TEC exhaust struts/vanes 48, TEC outer case 49, and exhaust tail cone 50.

FIG. 1 is a cross-sectional view of gas turbine engine 10. In the example two-spool, high bypass turbofan configuration shown, low spool 12 includes low pressure compressor (LPC) 14 driven by via low pressure turbine (LPT) 16 via low pressure shaft 18. High spool 20 includes high pressure compressor (HPC) 22 driven by high pressure turbine (HPT) 24 via and high pressure shaft 26. Low pressure 18 and high pressure shaft 26 are mounted coaxially and rotate at different speeds. The power core also includes combustor 28 arranged in flow series between the compressor and turbine sections. Each of the LPC, HPC, HPT, and LPT is arranged into a number of alternating stages of bladed rotors and stator vanes.

Propulsion fan rotor 32 drives air through the bypass duct coaxially oriented between the engine core and nacelle 30. Fan rotor (or other propulsion stage) 32 can be directly or indirectly rotationally coupled to low pressure shaft 18. In advanced designs, fan drive gear system 36 couples fan shaft 34 to low spool 12, with respective planetary, ring, and sun gear mechanisms 38, 40 and 42 providing independent fan speed control for reduced noise and improved operating efficiency. In more conventional turbofan designs, fan drive gear system 36 is omitted and fan 32 is driven directly as part of low spool 12. Fan exit guide vanes (FEGVs) 44 are disposed between nacelle 30 and the engine core to reduce swirl and improve thrust performance through the bypass duct. High performance embodiments of engine 10 may optionally include a thrust augmenter (not shown) proximate the exhaust of the power core.

Turbine exhaust case (TEC) 46 is disposed at an aft end of the power core of engine 10. Also visible in FIG. 1 are certain elements in or adjacent to TEC 46, including TEC struts/vanes 48, TEC outer case 49, exhaust tail cone 50. More details of the area in and around TEC 46 are shown in FIGS. 2A and 2B.

It will be recognized from the remainder of the description that the invention is by no means limited to the example two-spool high bypass turbofan engine shown in FIG. 1. By way of further non-limiting examples, fan rotor 32 may additionally or alternatively include an unducted rotor, with turbine engine 10 thereby operating as a turboprop or unducted turbofan engine. Alternatively, fan rotor 32 may be absent, leaving nacelle 30 covering only the engine core, with turbine engine 10 thereby being configured as a turbojet or turboshaft engine.

Figure 2A:
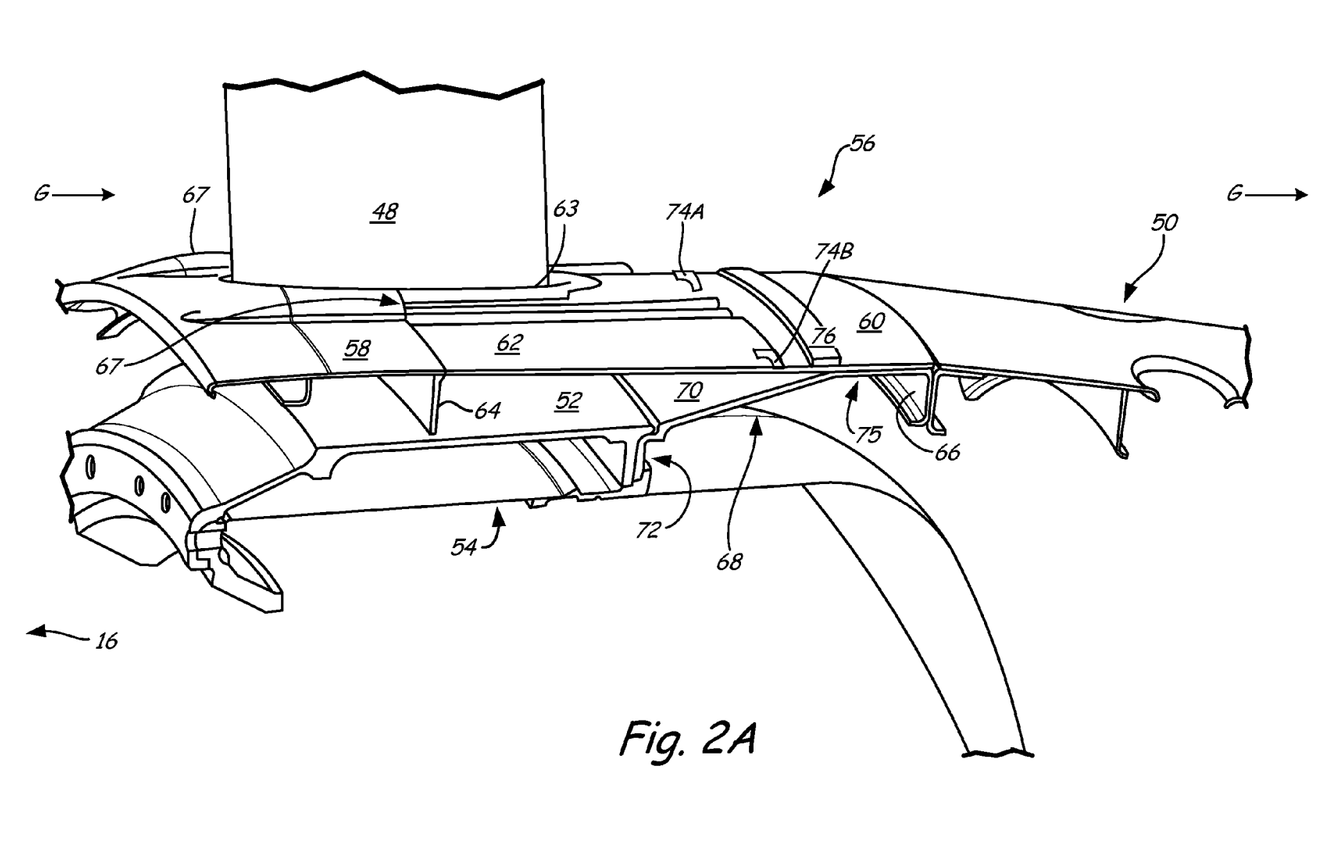
FIG. 2A is a partial cross-section at a turbine exhaust case (TEC) duct assembly.
Figure 2B:
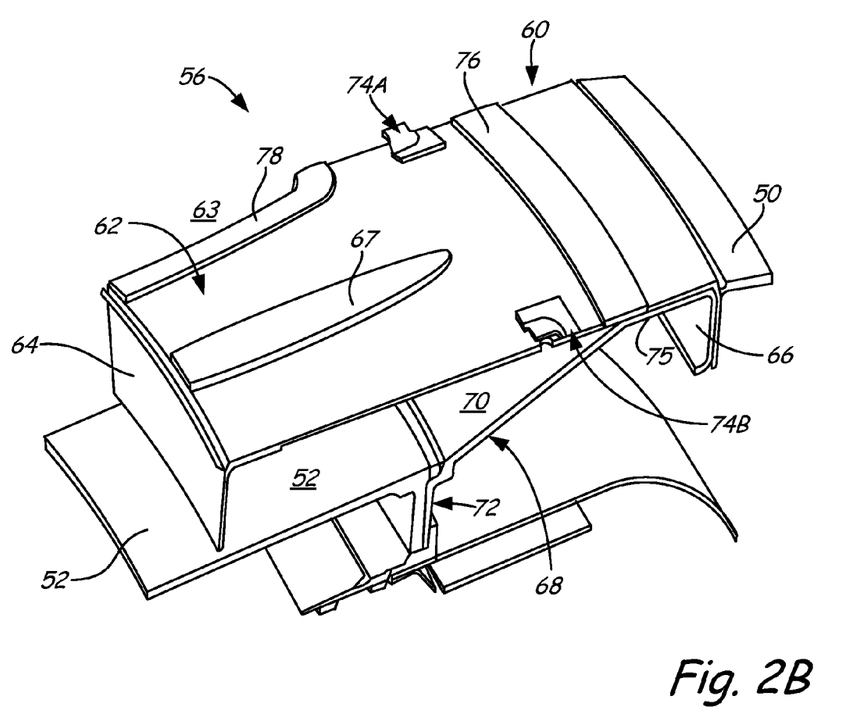
FIG. 2B depicts details around the partial cross-section of FIG. 2A.

FIG. 2A depicts a cutaway of an aft end of engine 10 and includes TEC 46, TEC struts/vanes 48, TEC outer case 49, exhaust tail cone 50, TEC inner case 52, bearing housing 54, aft TEC duct 56, forward TEC duct 58, aft shroud end 60, forward shroud end 62, strut cutout 63, forward flange assembly 64, aft flange 66, riblet 67, intermediate flange 68, obtuse flange portion 70, radial flange portion 72, first bleed port 74A, second bleed port 74B, flange connector 75, and outer stiffening ring 76. FIG. 2B is a more isometric view of that which is shown in FIG. 2A, and includes TEC 46, exhaust tail cone 50, TEC inner case 52, bearing housing 54, aft TEC duct 56, aft shroud end 60, forward shroud end 62, strut cutout 63, forward flange assembly 64, aft flange 66, riblet 67, intermediate flange 68, obtuse flange portion 70, radial flange portion 72, first bleed port 74A, second bleed port 74B, and flange connector 75, and outer stiffening ring 76.

Generally speaking, combustion gases G exiting the final stage of a turbine section (e.g., LPT 16 in FIG. 1) enter TEC 46, passing around a plurality of circumferentially distributed TEC struts/vanes 48 and out over tail cone 50. Struts 48 extend radially between outer case 49 (shown in FIG. 1) and inner case 52. In certain embodiments, inner case 52 and/or outer case 49 may be integral with or cooperate with aft bearing housing 54 to form part of the engine backbone and support the aft ends of the engine driveshafts (e.g., shafts 18, 26 in FIG. 1). In this example configuration, the shown TEC strut 48 is airfoil shaped, allowing it, along with at least some of the other distributed struts/vanes 48, to simultaneously serve as a turbine exit guide vane. The airfoil shaped outer surface may be a structural characteristic of strut/vane 48, or alternatively, strut/vane 48 includes one or more radially extending internal structural members clad in a hollow element having an airfoil-shaped outer surface.

Aft TEC duct 56 includes a shroud body having an axially aft shroud end 60 and a forward shroud end 62. In this particular example, forward shroud end 62 may include a plurality of circumferentially distributed strut cutouts 63. Strut cutouts 63 may be circumferentially distributed around forward end 62 for engaging a corresponding plurality of struts/vanes 48. Thus the shape of strut cutout 63 may complement at least an aft portion of strut/vane 48 to minimize leakage toward inner case 52 and/or bearing housing 54. Aft TEC duct 56 and forward TEC duct 58 can form a TEC duct assembly defining an inner flow boundary for exhaust gas G. This example combination defines the inner flow boundary of gas G leaving LPT 16. Forward TEC duct 58 may have corresponding strut cutouts (not numbered) aligned with strut cutouts 63, in which case the respective pairs of strut cutouts form passages through the boundary for each strut/vane 48. Tail cone 50 can also be secured to aft flange 66 (described below) to further define the TEC duct assembly and inner flow boundary. The duct assembly may also engage a portion of bearing housing 54 to provide additional stability as noted below.

Aft TEC duct 56 can include forward flange assembly 64 extending radially inward from the forward shroud end 62. Forward flange assembly 64 can join forward shroud end 62 to a component disposed axially forward of duct 56 and downstream of a final turbine stage. The forwardly adjacent component, such as forward TEC duct 58, may also include a corresponding flange (not numbered) to removably secure the two components together, minimizing gaps, particularly around strut/vane 48 and strut cutout 63, while strengthening the structural connection therebetween. As will be explained below, depending on the arrangement of strut cutouts 63 for TEC struts/vanes 48, forward flange assembly 64 may be a single flange extending entirely circumferentially around forward shroud end 62. Forward flange assembly 64 may alternatively be a number of partial circumferentially distributed flange sections to accommodate strut cutouts 63. In certain embodiments, such as those with a single TEC duct, forward flange assembly 64 can secure the duct directly adjacent to an outlet of the turbine.

Aft TEC duct 56 can also include aft flange 66 extending circumferentially around and radially inward from aft shroud end 60. Aft flange 66 can join aft shroud end 60 to an adjacent component axially aft thereof. In this example, the axially aft component is engine tail cone 50. This extends the inner boundary of the exhaust path to the end of the power core.

In certain embodiments, aft TEC duct 56 can also include intermediate flange 68 disposed at a midspan region of aft TEC duct 56. Here, intermediate flange 68 includes a first end of obtuse portion 70 extending axially forward and radially inward from aft shroud end 60. Radial portion 72 extends radially inward from a second opposing end of obtuse portion 70 and may occupy a radial plane substantially parallel to forward and aft flanges 64, 66. Radial portion 72 of intermediate flange 68 can be configured to mount aft TEC duct 56 to a centrally arranged structure, such as bearing housing 54. The connection may be direct or indirect, and may involve connection to TEC inner case 52.

Riblets 67 can optionally extend axially along the inner gas path boundary along one or both TEC ducts 56, 58. The circumferentially distributed riblets 67, disposed circumferentially adjacent to one or both sides of strut cutouts 63 can both reinforce ducts 56, 58, as well as improve boundary flow. Aft TEC duct 56 can include additional or alternative features visible in FIGS. 2A and/or 2B, such as bleed ports 74A, 74B, outer stiffening ring 76, and strut cutout stiffeners 78. Utilizing one or more of these and other features, better shown and described in the following figures, can reduce the likelihood of premature defects without substantially increasing engine weight.

Figure 3A:
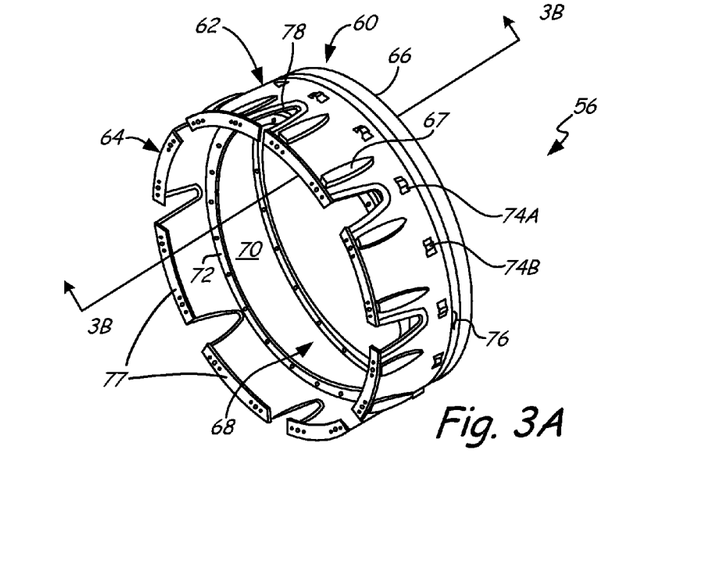
FIG. 3A is an isometric view of an example TEC duct.
Figure 3B:
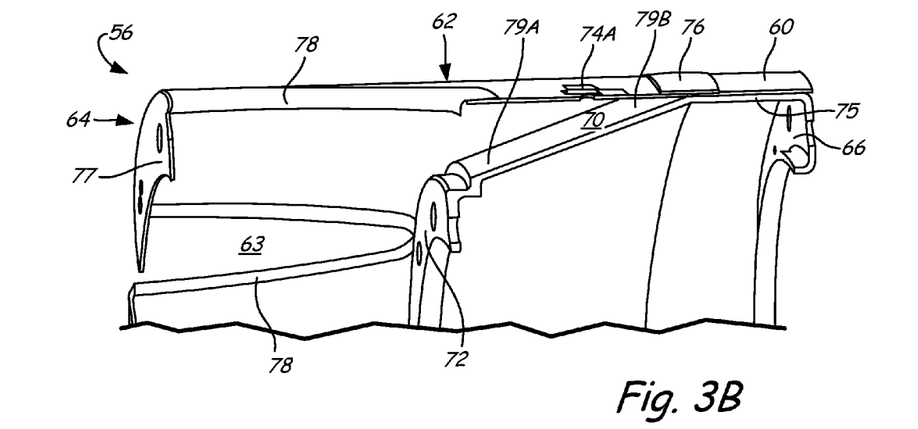
FIG. 3B is a cross-section of the TEC duct of FIG. 3A.

FIGS. 3A and 3B show aft TEC duct 56, aft shroud end 60, forward shroud end 62, strut cutouts 63, forward flange assembly 64, aft flange 66, riblets 67, intermediate flange 68, obtuse flange portion 70, radial flange portion 72, first bleed port 74A, second bleed port 74B, flange connector 75, and outer stiffening ring 76, forward flange segment 77, strut cutout stiffening ribs 78, inner obtuse flange end 79A, and outer obtuse flange end 79B.

FIG. 3A is an isometric view of an example embodiment of aft TEC duct 56. FIG. 3B is a cross-section taken across line 3B-3B of FIG. 3A. In certain embodiments, TEC 46 (shown in FIGS. 2A and 2B) is a "rapid response" exhaust case, designed to quickly expand during rapidly changing thermal loads so as to increase peak performance and prevent problems from excessive interface gaps. Rapid response TEC 46 can also reduce detection of thermal exhaust signatures by closely controlling the exhaust plume and minimizing thermal leakage between exhaust components while allowing for rapid thermal expansion and contraction.

One aspect of a "rapid response" TEC duct assembly can include aft TEC duct 56 with intermediate flange 68. As discussed above, certain embodiments of intermediate flange 68 can have obtuse portion 70 and radial portion 72. Outer end 79B of obtuse flange portion 70 extends toward inner end 79A (and radial flange portion 72) to form an interior angle with aft shroud end 60. This angle may be between about 45° and about 75°. In certain embodiments, the interior angle is about 60°.

This arrangement controls radial and axial expansion/contraction of aft TEC duct 56 relative to surrounding components during periods of rapidly changing operational conditions, such as may be seen in military aircraft engines with a thrust augmenter. Controlling this growth reduces exhaust leaks at the various gaps, reducing the engine's thermal signature. However, in certain of these rapid response embodiments, thermal cracking can occur in aft TEC duct caused by excessive thermal gradients across and through the duct. As part of the inner flow path boundary, shroud ends 60, 62 are exposed to hot exhaust gas G (shown in FIG. 2A). Starting the augmenter (not shown) rapidly increases the temperature of gas G, thermally expanding shrouds of the outer TEC duct assembly. Stopping the augmenter quickly decreases these temperatures Thus during the times immediately after starting or stopping the augmenter, the temperature inside the ducts has not caught up to the outer surface temperature. Bulging and contraction of aft TEC duct 56 can result due to thermal cycling fatigue cracking.

Cracking is most prone to occur axially aft of strut cutouts 63 near the junction of aft shroud end 60 and intermediate flange 68. To reduce gradients between outer and inner regions, aft TEC duct 56 can therefore include one or more bleed ports 74A, 74B. A first plurality of bleed ports 74A can be circumferentially distributed equally around aft shroud end 60 proximate midspan of the duct. In the example of FIG. 3A, port 74A is disposed axially aft of strut cutout 63. In the event strut 48 also serves as a guide vane, ports 74A may be circumferentially aligned relative to strut cutouts 63. In one example, port 74A is circumferentially aligned with the apex of strut cutout 63. An additional plurality of bleed ports 74B can be optionally provided and disposed circumferentially intermediate adjacent ones of the first plurality of bleed ports 74A. Ports 74A, 74B may be axially disposed immediately forward of the junction of intermediate flange 68 and aft shroud end 60.

Ports 74A, 74B can include at least one hole for providing turbine exhaust air radially inward from aft TEC duct 56, equalizing temperatures adjacent bearing housing 54 and/or inner TEC case 52 (shown in FIGS. 2A and 2B). The hole can be directed generally between inner and outer regions of TEC 46 and more directly to impinge flowing exhaust gas G onto one or more flanges, such as intermediate flange obtuse portion 70. This reduces thermal differentials between intermediate flange 68 and aft shroud end 60, which lowers the magnitude and frequency of thermal cycling and the resultant incidence of low cycle fatigue. Further bleed ports 74A, 74B may be provided elsewhere on aft TEC duct 56 as needed to further reduce thermal cycling fatigue.

FIG. 3A shows eight strut cutouts 63 for eight corresponding struts/vanes 48 (shown in FIG. 2A). With eight intermediate ports 74B, there are a total of sixteen ports 74A, 74B circumferentially distributed equally around aft shroud end 60 in the example shown. However, this configuration will vary based on individual structural requirements relative to the arrangement of struts/vanes 48, as well as on actual or expected thermal gradients around and through aft TEC duct 56.

Optionally, aft TEC duct 56 can also include reinforcing structures or elements on one or both of aft shroud end 60 and forward shroud end 62. In FIG. 3B, it can be seen that flange connector 75 joins aft flange 66 with outer end 79B of obtuse flange portion 70, reinforcing aft shroud end 60. An outer stiffening ring 76 can also be secured aft of ports 74A, 74B, allowing use of a thinner duct wall for aft shroud end 60. Stiffening ribs 78 can reinforce perimeters of respective strut cutouts 63A, enabling thinner walls for forward shroud end 62.

In the examples shown, forward flange assembly 64 is made up of a plurality of circumferentially distributed forward flange segments 77 for connection downstream of the final turbine stage (e.g., connection to forward TEC duct 56). As noted above, forward flange assembly 64 may alternatively be a monolithic flange.

Figure 4:
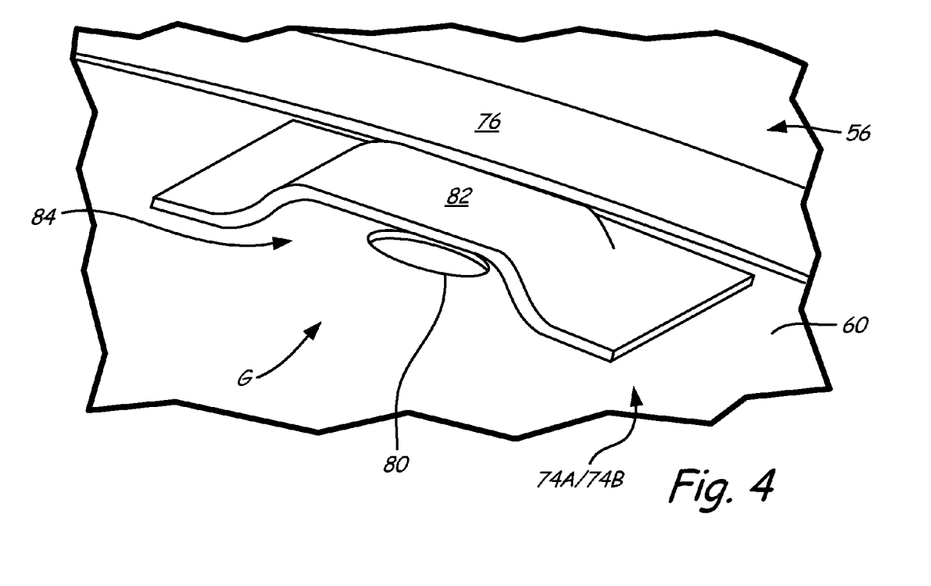
FIG. 4 shows details of an example bleed port on the TEC duct.

FIG. 4 shows one example embodiment of port 74A/74B disposed forward of outer stiffening ring 76. In certain embodiments, port 74A/74B includes bleed hole 80 having an inlet on the gas path side (outer surface of aft shroud end 60) and an outlet on the interior of duct 56. As shown in FIG. 3B, the outlet of hole 80 can be directed to impinge a portion of oncoming exhaust gas G onto intermediate flange 68, and optionally onto flange obtuse portion 70. This increases the thermal response of intermediate flange 68, reducing the thermal gradient across the same. Port 74A/74B can also optionally include scoop 82 over hole 80 to locally increase the pressure, and thus flow rate, of the entering portion of bleed gas G. As seen in FIG. 4, scoop 82 forms opening 84 which may be oriented toward oncoming exhaust gas G.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

An exhaust duct comprises a shroud body, a forward flange assembly, an aft flange assembly, an intermediate flange assembly, and a first plurality of bleed ports. The forward flange assembly extends radially inward from a forward shroud end for securing the forward shroud end downstream of a final turbine stage. The aft flange assembly extends circumferentially around and radially inward from an aft shroud end for securing the aft shroud end to an engine tail cone. The intermediate flange assembly is disposed forward of the aft flange assembly, and extends circumferentially around and radially inward from the shroud body for securing the shroud body to an engine bearing housing. The first plurality of bleed ports is disposed around the shroud body forward of a junction with the intermediate flange.

The apparatus of the preceding paragraph can optionally include, additionally and/or alternatively, any one or more of the following features, configurations and/or additional components:

the first plurality of bleed ports optionally are circumferentially distributed equally around the shroud body;

the first plurality of bleed ports optionally include at least one hole disposed radially outward from at least one surface of the shroud body;

the at least one hole is optionally shaped to impinge exhaust gas flow onto the at least one surface of the intermediate flange assembly;

the at least one surface of the intermediate flange assembly is optionally an obtuse surface angled axially forward and radially inward from the shroud body;

at least one of the first plurality of bleed ports optionally further includes a scoop arranged over the at least one hole, the scoop having an opening for facing a direction of oncoming exhaust gas flow;

the exhaust duct optionally further comprises a second plurality of bleed ports circumferentially intermediate adjacent ones of the first plurality of bleed ports;

the forward end of the shroud body optionally includes a plurality of circumferentially distributed strut cutouts, each strut cutout shaped to engage with an aft portion of a corresponding turbine exhaust case support strut;

at least one of the plurality of circumferentially distributed strut cutouts optionally includes a stiffener rib secured around a perimeter thereof;

at least one of the first plurality of bleed ports is optionally circumferentially aligned with a corresponding at least one of the plurality of circumferentially distributed strut cutouts;

the exhaust duct optionally further comprises a flange connector disposed radially inward of the shroud body, the connector joining the intermediate flange and the aft flange; and the exhaust duct optionally further comprises an outer stiffener ring disposed axially around the shroud body aft of the first plurality of bleed ports, over the flange connector.

A turbine exhaust case (TEC) duct assembly comprises a forward TEC duct, an aft TEC duct, and an engine tail cone. The aft TEC duct includes an aft TEC duct shroud body with an inwardly extending forward flange assembly securing a forward shroud end to the forward TEC duct. An inwardly extending aft flange assembly secures an aft shroud end to the engine tail cone. An inwardly extending intermediate flange assembly is provided for securing the aft TEC duct to an engine bearing housing. The shroud body includes a first plurality of bleed ports disposed forward of a junction of the shroud body and intermediate flange assembly.

The apparatus of the preceding paragraph can optionally include, additionally and/or alternatively, any one or more of the following features, configurations and/or additional components:

respective outer surfaces of the forward TEC duct shroud body, the aft TEC duct shroud body, and the engine tail cone cooperate to define an inner exhaust gas path boundary;

the forward TEC duct optionally includes a first plurality of strut cutouts circumferentially distributed around an aft shroud end, and the aft TEC duct includes a second plurality of strut cutouts circumferentially distributed around the forward shroud end, and respective ones of the first and second pluralities of shroud body strut cutouts forming passages through the inner exhaust gas path boundary for circumferentially distributed TEC struts operating as exhaust guide vanes;

the intermediate flange assembly optionally extends circumferentially around and radially inward from the aft TEC duct shroud body, and at least one surface of the intermediate flange assembly is an obtuse surface angled axially forward and radially inward from the shroud body;

the plurality of bleed ports are optionally distributed equally around a circumference of the shroud body and include at least one hole in the shroud body disposed radially outward of at least one surface of the intermediate flange assembly, the at least one hole shaped to impinge exhaust gas flow onto the at least one surface of the intermediate flange assembly;

at least one of the plurality of bleed ports optionally further includes a scoop arranged over the at least one hole;

the scoop optionally has an opening for facing a direction of oncoming exhaust gas flow; and the assembly optionally further comprises a flange connector disposed radially inward of the shroud body, the connector joining the intermediate flange assembly and the aft flange assembly.

The invention claimed is:

1. An exhaust duct comprising:
   a shroud body having a forward shroud end and an aft shroud end;
   a forward flange assembly extending radially inward from the forward shroud end for securing the forward shroud end downstream of a final turbine stage;
   an aft flange assembly extending circumferentially around and radially inward from the aft shroud end for securing the aft shroud end to an engine tail cone;
   an intermediate flange assembly disposed forward of the aft flange assembly, and extending circumferentially around and radially inward from the shroud body for securing the shroud body to an engine bearing housing; and
   a first plurality of bleed ports disposed on the shroud body forward of a junction with the intermediate flange assembly.

2. The exhaust duct of claim 1, wherein the first plurality of bleed ports are circumferentially distributed equally around the shroud body.

3. The exhaust duct of claim 1, wherein the first plurality of bleed ports include at least one hole disposed radially outward from at least one surface of the shroud body.

4. The exhaust duct of claim 3, wherein the at least one hole is shaped to impinge exhaust gas flow onto the at least one surface of the intermediate flange assembly.

5. The exhaust duct of claim 4, wherein the at least one surface of the intermediate flange assembly is an obtuse surface angled axially forward and radially inward from the shroud body.

6. The exhaust duct of claim 4, wherein at least one of the first plurality of bleed ports further includes a scoop arranged over the at least one hole, the scoop having an opening for facing the direction of oncoming exhaust gas flow.

7. The exhaust duct of claim 1, further comprising a second plurality of bleed ports circumferentially intermediate adjacent ones of the first plurality of bleed ports.

8. The exhaust duct of claim 1, wherein the forward shroud end includes a plurality of circumferentially distributed strut cutouts, each strut cutout shaped to engage with an aft portion of a corresponding turbine exhaust case support strut.

9. The exhaust duct of claim 8, wherein at least one of the plurality of circumferentially distributed strut cutouts includes a stiffener rib secured around a perimeter thereof.

10. The exhaust duct of claim 8, wherein at least one of the first plurality of bleed ports is circumferentially aligned with a corresponding at least one of the plurality of circumferentially distributed strut cutouts.

11. The exhaust duct of claim 1, further comprising a flange connector disposed radially inward of the shroud body, the connector joining the intermediate flange assembly and the aft flange assembly.

12. The exhaust duct of claim 11, further comprising an outer stiffener ring disposed axially around the shroud body aft of the first plurality of bleed ports, and over the flange connector.

13. A turbine exhaust case (TEC) duct assembly comprising:
   a forward TEC duct;
   an aft TEC duct including a shroud body with a first plurality of bleed ports, an inwardly extending forward flange assembly securing a forward shroud end to the forward TEC duct, an inwardly extending aft flange assembly, and an inwardly extending intermediate flange assembly for securing the aft TEC duct to an engine bearing housing, the first plurality of bleed ports disposed on the shroud body forward of a junction with the intermediate flange assembly; and
   an engine tail cone secured to the aft TEC duct at the aft flange assembly.

14. The assembly of claim 13, wherein respective outer surfaces of the forward TEC duct shroud body, the aft TEC duct shroud body, and the engine tail cone cooperate to define an inner exhaust gas path boundary.

15. The assembly of claim 14, wherein the forward TEC duct includes a first plurality of strut cutouts circumferentially distributed around an aft shroud end, and the aft TEC duct includes a second plurality of strut cutouts circumferentially distributed around the forward shroud end, and wherein respective ones of the first and second pluralities of shroud body strut cutouts cooperate to form passages through the inner exhaust gas path boundary for circumferentially distributed TEC struts operating as exhaust guide vanes.

16. The assembly of claim 13, wherein the intermediate flange assembly extends circumferentially around and radially inward from the aft TEC duct shroud body, and at least one surface of the intermediate flange is an obtuse surface angled axially forward and radially inward from the shroud body.

17. The assembly of claim 16, wherein the first plurality of bleed ports are circumferentially distributed equally around the shroud body and include at least one hole in the shroud body disposed radially outward of at least one surface of the intermediate flange assembly, the at least one hole shaped to impinge exhaust gas flow onto the at least one surface of the intermediate flange assembly.

18. The assembly of claim 17, wherein at least one of the plurality of bleed ports further includes a scoop arranged over the at least one hole.

19. The assembly of claim 18, wherein the scoop has an opening for facing the direction of oncoming exhaust gas flow.

20. The assembly of claim 13, further comprising a flange connector disposed radially inward of the shroud body, the connector joining the intermediate flange assembly and the aft flange assembly.

* * * * *